US008056641B2

(12) United States Patent
Kriesels et al.

(10) Patent No.: US 8,056,641 B2
(45) Date of Patent: Nov. 15, 2011

(54) METHOD OF RADIALLY EXPANDING A TUBULAR ELEMENT IN A WELLBORE PROVIDED WITH A CONTROL LINE

(75) Inventors: Petrus Cornelis Kriesels, Rijswijk (NL); Pieter Van Nieuwkoop, Rijswijk (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 12/764,655

(22) Filed: Apr. 21, 2010

(65) Prior Publication Data
US 2010/0200248 A1    Aug. 12, 2010

Related U.S. Application Data

(63) Continuation of application No. PCT/EP2008/064163, filed on Oct. 21, 2008.

(30) Foreign Application Priority Data

Oct. 23, 2007  (EP) .................................. 07119090

(51) Int. Cl.
*E21B 19/00* (2006.01)
(52) U.S. Cl. .......................... 166/384; 166/207; 405/184
(58) Field of Classification Search .................. 166/384, 166/242.2, 207; 405/150.1, 184, 165, 146; 175/171, 78, 52
See application file for complete search history.

(56) References Cited

U.S. PATENT DOCUMENTS

| 5,305,798 | A | * | 4/1994 | Driver ............................. 138/98 |
| 5,309,994 | A | * | 5/1994 | Douglas et al. ............... 166/278 |
| 5,634,743 | A | * | 6/1997 | Chandler ................... 405/150.1 |
| 5,778,938 | A | * | 7/1998 | Chick et al. ..................... 138/98 |
| 6,311,730 | B2 | * | 11/2001 | Penza ............................. 138/98 |
| 6,932,116 | B2 | * | 8/2005 | Smith et al. .................... 138/98 |
| 2003/0056948 | A1 | | 3/2003 | Cameron ...................... 166/206 |
| 2007/0114016 | A1 | | 5/2007 | Brezinski et al. ............. 166/179 |

FOREIGN PATENT DOCUMENTS

| EP | 0044706 | 1/1982 |
| EP | 0919762 | 6/1999 |
| EP | 1262809 | 12/2002 |
| WO | WO03036025 | 5/2003 |
| WO | WO2004020893 | 3/2004 |
| WO | WO2005024178 | 3/2005 |

* cited by examiner

*Primary Examiner* — Shane Bomar
*Assistant Examiner* — Kipp Wallace

(57) ABSTRACT

A method for radially expanding a tubular element in a wellbore and providing a control line that extends along the tubular element comprises (a) inducing the wall of the tubular element to bend radially outward and in axially reverse direction so as to form an expanded tubular section extending around a remaining tubular section of the tubular element, wherein said bending occurs in a bending zone of the tubular element, (b) increasing the length of the expanded tubular section by inducing the bending zone to move in axial direction relative to the remaining tubular section, wherein said wall includes a material that is plastically deformed in the bending zone during the bending process so that the expanded tubular section retains an expanded shape as a result of said plastic deformation, and (c) extending the control line along the tubular element.

14 Claims, 4 Drawing Sheets

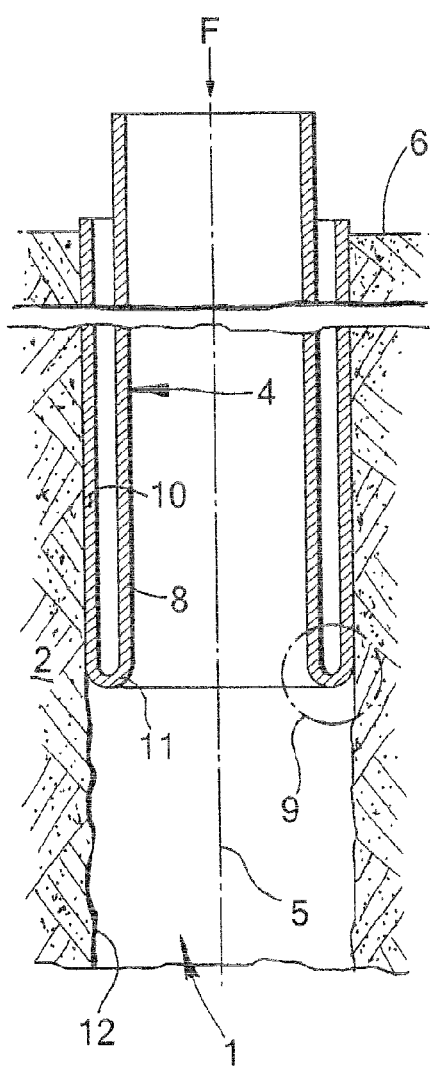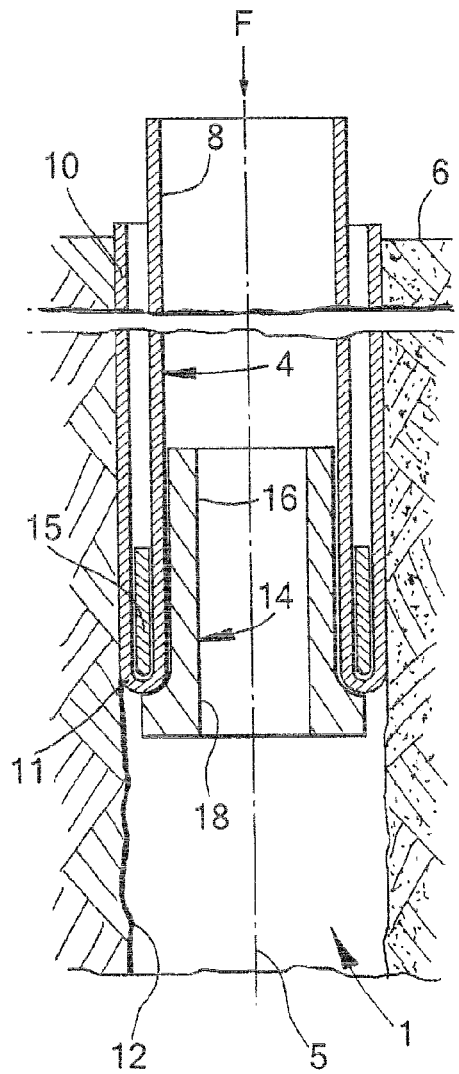

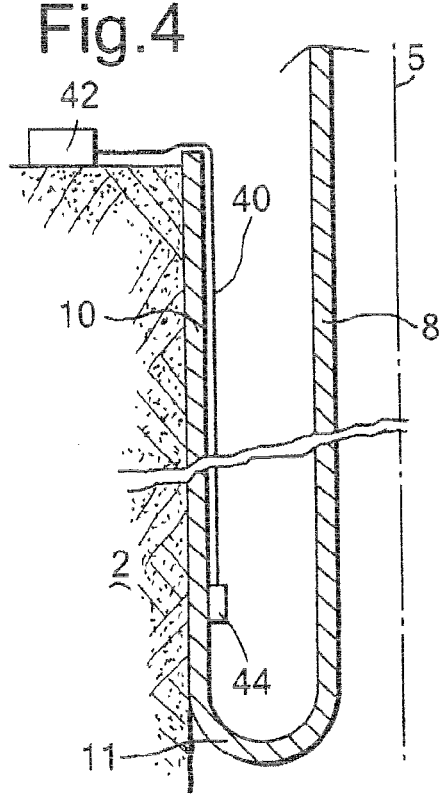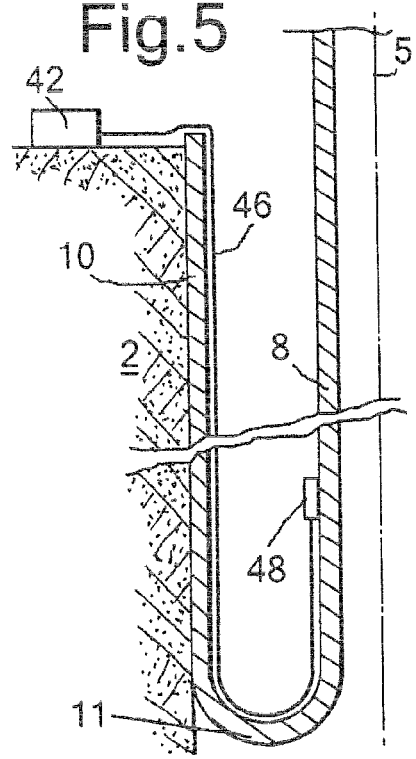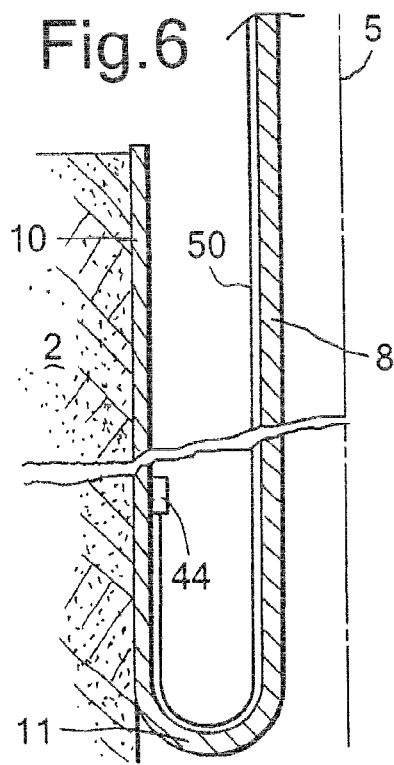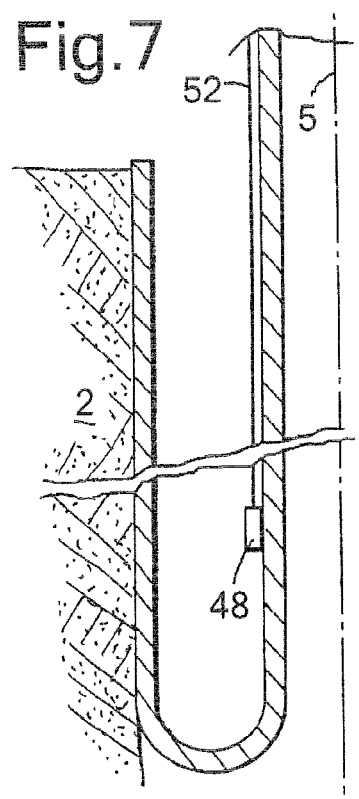

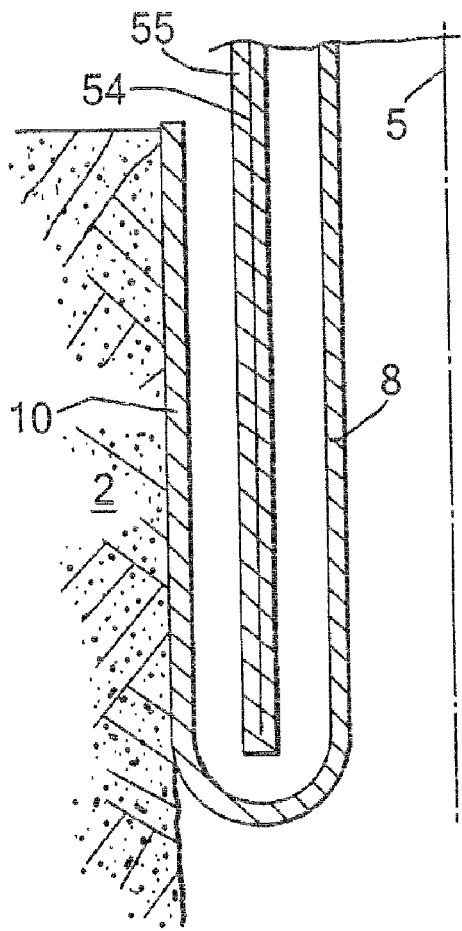
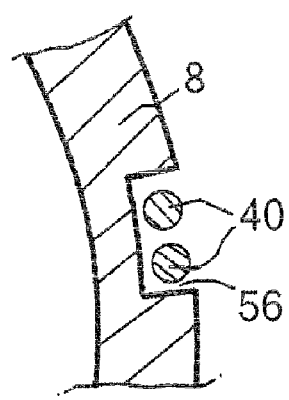
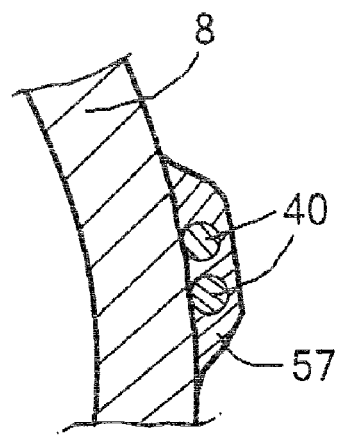

METHOD OF RADIALLY EXPANDING A TUBULAR ELEMENT IN A WELLBORE PROVIDED WITH A CONTROL LINE

RELATED CASES

The present application is a continuation of and claims priority to PCT Application EP2008/064163, filed 21 Oct. 2008, which in turn claims priority from European Application EP07119090.4, filed 23 Oct. 2007.

FIELD OF THE INVENTION

The present invention relates to a method of radially expanding a tubular element in a wellbore, in which a control line extends along the tubular element.

BACKGROUND OF THE INVENTION

In the industry of oil and gas production from a wellbore it has become practice to radially expand a tubular element in the wellbore. Generally a wellbore is provided with one or more casings or liners to provide stability to the wellbore wall, and/or to provide zonal isolation between different layers of the earth formation. The terms "casing" and "liner" refer to tubular elements for supporting and stabilising the wellbore wall, whereby it is generally understood that a casing extends from surface into the wellbore and that a liner extends from a downhole location further into the wellbore. However, in the present context, the terms "casing" and "liner" are used interchangeably and without such intended distinction.

In conventional wellbore construction, several casings are set at different depth intervals, in a nested arrangement, whereby each subsequent casing is lowered through the previous casing and therefore must have a smaller diameter than the previous casing. As a consequence, the available cross-sectional wellbore size decreases with depth. To alleviate this drawback, it has become practice to radially expand tubular elements in the wellbore after lowering to the required depth, for example to form an expanded casing or liner section or a clad against an existing casing. Also, it has been proposed to radially expand each subsequent casing to substantially the same diameter as the previous casing to form a monobore wellbore. It is thus achieved that the available diameter of the wellbore is kept substantially constant along (a portion of) its depth as opposed to the conventional nested arrangement.

EP 1438483 B1 discloses a method of radially expanding a tubular element in a wellbore whereby the tubular element, in unexpanded state, is initially attached to a drill string during drilling of a new wellbore section. Thereafter the tubular element is radially expanded and released from the drill string.

To expand such wellbore tubular element, generally a conical expander is used with a largest outer diameter substantially equal to the required tubular diameter after expansion. The expander is pumped, pushed or pulled through the tubular element. Such method can lead to high friction forces that need to be overcome, between the expander and the inner surface of the tubular element. Also, there is a risk that the expander becomes stuck in the tubular element.

EP 0044706 A2 discloses a method of radially expanding a flexible tube of woven material or cloth by eversion thereof in a wellbore, to separate drilling fluid pumped into the wellbore from slurry cuttings flowing towards the surface.

Although the known expansion techniques may be of practical use in some applications, there remains a need for an improved method of radially expanding a tubular element.

SUMMARY OF THE INVENTION

In accordance with the invention there is provided a method of radially expanding a tubular element in a wellbore whereby a control line extends along the tubular element, the method comprising
(a) inducing the wall of the tubular element to bend radially outward and in axially reverse direction so as to form an expanded tubular section extending around a remaining tubular section of the tubular element, wherein said bending occurs in a bending zone of the tubular element;
(b) increasing the length of the expanded tubular section by inducing the bending zone to move in axial direction relative to the remaining tubular section, wherein said wall includes a material that is plastically deformed in the bending zone during the bending process so that the expanded tubular section retains an expanded shape as a result of said plastic deformation; and
(c) extending the control line along the tubular element.

Thus, in effect the tubular element is everted, i.e. turned inside out during the bending process. The bending zone defines the location where the bending process takes place. By inducing the bending zone to move in axial direction along the tubular element it is achieved that the tubular element is progressively expanded without the need for an expander that has to be pushed, pulled or pumped through the tubular element. Furthermore the expanded tubular section retains its shape due to plastic deformation of the wall, that is, permanent deformation of the wall. It is thereby achieved that no external force or pressure needs to be exerted to the expanded tubular section to maintain its expanded shape. If, for example, the expanded tubular section has been expanded against the wellbore wall as a result of the bending process, no external radial force or pressure needs to be exerted to the expanded tubular section to keep it against the wellbore wall.

Preferably the tubular element is made of a metal such as steel or any other ductile metal capable of being plastically deformed by eversion of the tubular element. The expanded tubular section then has adequate collapse resistance against an external pressure in the order of 100-150 bars. If the tubular element extends vertically in the wellbore, the weight of the remaining tubular section can be utilised to contribute to the force needed to induce downward movement of the bending zone.

The control line can be formed, for example, as an electric wire, an optical fibre or a hydraulic line for communication with downhole equipment to measure downhole parameters or to control downhole equipment such as valves. Also, the control line can be formed as a power supply line for supplying electric or hydraulic power to a downhole device.

Suitably the bending zone is induced to move in axial direction relative to the remaining tubular section by moving the remaining tubular section in axial direction relative to the expanded tubular section. For example, the expanded tubular section is held stationary while the remaining tubular section is moved in axial direction through the expanded tubular section to induce said bending of the wall.

The control line is suitably extended along the tubular element by connecting the control line to the remaining tubular section and allowing the control line to move in axial direction relative to the expanded tubular section simultaneously with said movement of the remaining tubular section.

During the eversion process, the control line preferably bends adjacent the bending zone simultaneously with said bending of the wall of the tubular element.

The control line extends, for example, from a first terminal at surface to a second terminal provided at one of the expanded tubular section and the remaining tubular section. Furthermore, the control line can be connected to an outer surface of the remaining tubular section or to an inner surface of the remaining tubular section.

Alternatively the control line is extended along the tubular element by moving the control line into an annular space formed between the remaining tubular section and the expanded tubular section. For example, the control line can be run into the annular space by means of a weight connected to the control line, by hydraulic pumping, or by incorporating the control line into a sleeve that is lowered into the annular space.

In order to induce said movement of the remaining tubular section, it is preferred that the remaining tubular section is subjected to an axially compressive force acting to induce said movement. The axially compressive force suitably at least partly results from the weight of the remaining tubular section. If necessary the weight can be supplemented by an external, downward, force applied to the remaining tubular section to induce said movement. Since the length, and hence the weight, of the remaining tubular section increases during the eversion process, an upward force may have to be applied to the remaining tubular section in order to prevent uncontrolled bending or buckling of the tubular element.

If the bending zone is located at a lower end of the tubular element, whereby the remaining tubular section is axially shortened at a lower end thereof due to said movement of the bending zone, it is preferred that the remaining tubular section is axially extended at an upper end thereof in correspondence with said axial shortening at the lower end thereof. The remaining tubular section gradually shortens at its lower end due to continued reverse bending of the wall. Therefore, by extending the remaining tubular section at its upper end to compensate for shortening at the lower end, the eversion process can be continued until a desired length of the expanded tubular section is reached. The remaining tubular section can be extended at its upper end, for example, by connecting one or more tubular portions at the upper end such as by welding. Alternatively, the remaining tubular section can be formed as a coiled tubing that is unreeled from a reel and gradually inserted into the wellbore. Thus, in effect the coiled tubing is extended at its upper end by unreeling from the reel.

As a result of forming the expanded tubular section around the remaining tubular section, an annular space is formed between the unexpanded and expanded tubular sections. To increase the collapse resistance of the expanded tubular section, a pressurized fluid can be inserted into the annular space. The fluid pressure can be due to the weight of the fluid column in the annular space, and/or from an external pressure applied to the fluid column.

The expansion process is suitably initiated by bending the wall of the tubular element at a lower end portion thereof.

In a preferred embodiment a drill string extends through the remaining tubular section for further drilling of the wellbore. Suitably the remaining tubular section and the drill string are simultaneously lowered through the wellbore during drilling with the drill string.

To seal the expanded tubular section relative to the wellbore wall, or to another tubular element arranged in the wellbore, suitably the expanded tubular section is compressed against the wellbore wall or against said another tubular element as a result of eversion of the tubular element.

BRIEF DESCRIPTION OF THE DRAWINGS

The invention will be described hereinafter in more detail and by way of example, with reference to the accompanying drawings in which:

FIG. 1 schematically shows an embodiment of a system for use with the method of the invention;

FIG. 2 schematically shows a further embodiment of a system for use with the method of the invention;

FIG. 4 schematically shows a detail of the left symmetrical half of FIG. 1, indicating a first arrangement for a control line;

FIG. 5 schematically shows a detail of the left symmetrical half of FIG. 1, indicating a second arrangement for a control line;

FIG. 6 schematically shows a detail of the left symmetrical half of FIG. 1, indicating a third arrangement for a control line;

FIG. 7 schematically shows a detail of the left symmetrical half of FIG. 1, indicating a fourth arrangement for a control line;

FIG. 8 schematically shows a detail of the left symmetrical half of FIG. 1, indicating a fifth arrangement for a control line;

FIG. 9A schematically shows a cross-sectional view of an arrangement of a pair of control lines; and FIG. 9B schematically shows a cross-sectional view of an alternative arrangement of a pair of control lines.

In the Figures and the description like reference numerals relate to like components.

DETAILED DESCRIPTION OF THE PREFERRED EMBODIMENTS

Figure 3:
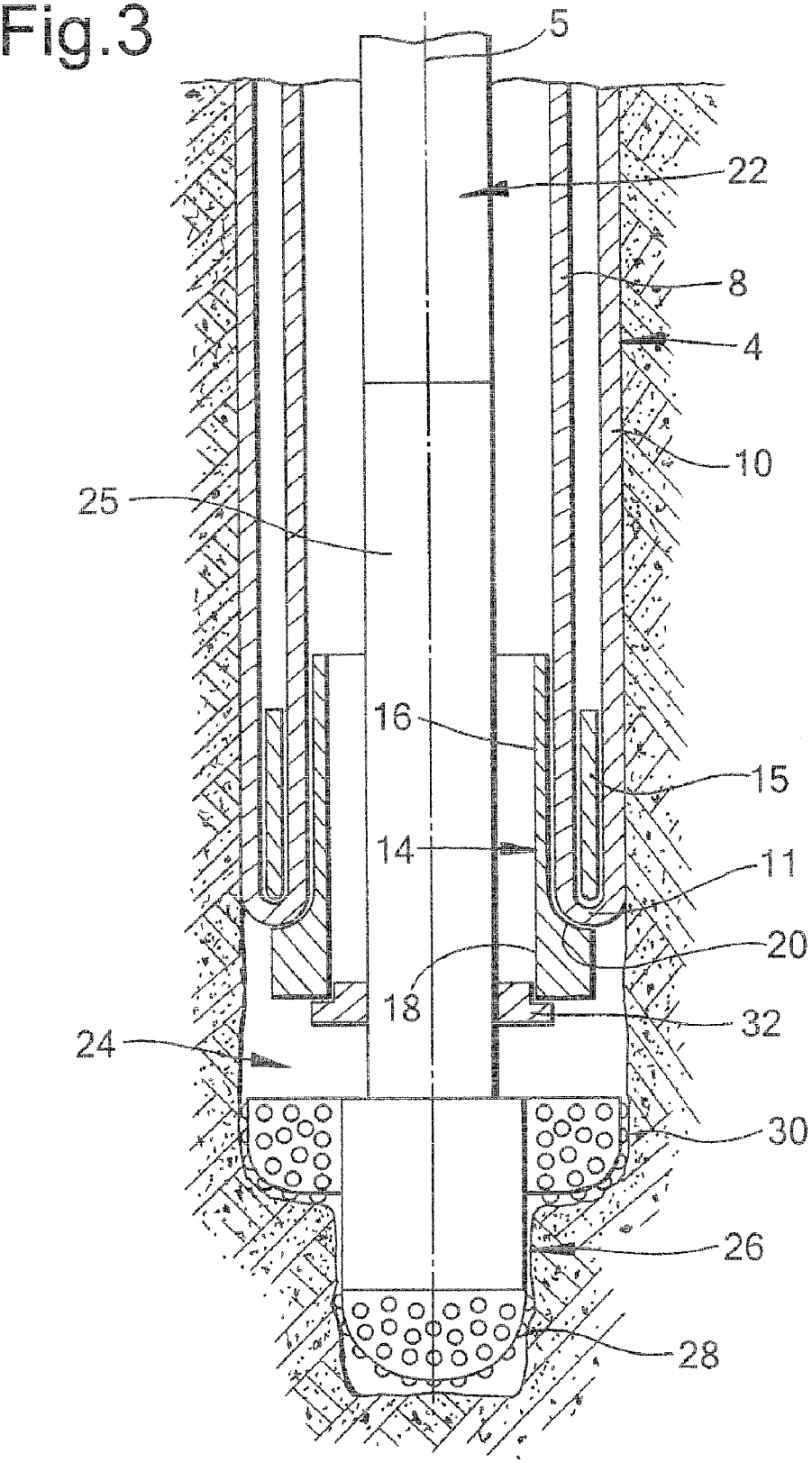
FIG. 3 schematically shows another embodiment of a system for use with the method of the invention.

Referring to FIG. 1 there is shown a system comprising a wellbore 1 formed into an earth formation 2, and a radially expandable tubular element in the form of an expandable steel liner 4 extending from surface 6 downwardly into the wellbore 1, the liner having a central longitudinal axis 5. The liner 4 has a radially expanded tubular section 10 and a remaining tubular section in the form of unexpanded section 8 extending within the expanded section 10. The wall of the unexpanded section 8 bends, at its lower end, radially outward and in axially reverse (i.e. upward) direction so as to form a U-shaped lower section 11 interconnecting the unexpanded section 8 and the expanded section 10. The U-shaped lower section 11 defines a bending zone 9 of the tubular element 4. The expanded liner section 10 is axially fixed to the wellbore wall 12 by virtue of frictional forces between the expanded section 10 and the wellbore wall 12 due to compression of the expanded section 10 against the wellbore wall as a result of the eversion process described below. Alternatively, or additionally, the expanded section 10 can be anchored to the wellbore wall 12 by any suitable anchoring means (not shown).

The system of FIG. 2 comprises, in addition to the components described with reference to FIG. 1, a tubular guide member 14 and an auxiliary guide ring 15. The guide member 14 has an upper part 16 extending into the unexpanded liner section 8 and a lower part 18 extending below the U-shaped lower section 11 of the liner 4. The lower part 18 has an external, concave, guide surface 20 extending radially outward and being arranged to guide, and support, the U-shaped lower section 11. The guide member 14 can be suspended from surface by means of a suitable string or cable (not shown) extending through the unexpanded section 8. Alternatively, the guide member 14 is simply supported by friction forces between the guide member and the unexpanded liner section 8, or by friction forces between the guide member and the wellbore wall 12. In the latter case the guide member 14 suitably is provided with, for example, brush-like elements that scrape along the wellbore wall 12. The auxiliary guide ring 15 is located between the expanded liner section 10 and the unexpanded liner section 8, and rests on the U-shaped lower section 11.

The system of FIG. 3 comprises, in addition to the components described with reference to FIG. 2, a drill string 22 extending from surface through the unexpanded liner section 8 to the bottom of the wellbore 24. The drill string 22 is provided with a support ring 32 to support the guide member 14. The support ring 32 is radially retractable so as to allow it to pass in retracted mode through the guide member 14 and the unexpanded liner section 8. The drill string 22 has a bottom hole assembly including a downhole motor 25 and a drill bit 26 driven by the downhole motor 25. The drill bit 26 comprises a pilot bit 28 with gauge diameter slightly smaller than the internal diameter of the guide member 14, and a reamer section 30 with gauge diameter adapted to drill the wellbore 24 to its nominal diameter. The reamer section 30 is radially retractable to an outer diameter slightly smaller than the internal diameter of the guide member 14 so that the drill bit 26 is capable of passing through the guide member 14 and the unexpanded liner section 8 when the reamer section 30 is in the collapsed mode.

Referring further to FIG. 4 there is shown a detail of the left symmetrical half of the embodiment of FIG. 1, whereby a control line 40 extends from a surface terminal 42, along the radially inner surface of the expanded section 10, to a downhole terminal 44 provided at the expanded section 10.

Referring further to FIG. 5 there is shown a detail of the left symmetrical half of the embodiment of FIG. 1, whereby a control line 46 extends from the surface terminal 42, along the radially inner surface of the expanded section 10, the U-shaped lower section 11 and the radially outer surface of the unexpanded section 8, to a downhole terminal 48 provided at the unexpanded section 8.

Referring further to FIG. 6 there is shown a detail of the left symmetrical half of the embodiment of FIG. 1, whereby a control line 50 extends from a terminal at surface (not shown), along the radially outer surface of the unexpanded section 8, the U-shaped lower section 11 and the radially inner surface of the expanded section 10, to the downhole terminal 44 provided at the expanded section 10.

Referring further to FIG. 7 there is shown a detail of the left symmetrical half of the embodiment of FIG. 1, whereby a control line 52 extends from a terminal at surface (not shown), along the radially outer surface of the unexpanded section 8, to the downhole terminal 48 provided at the unexpanded section 8.

Referring further to FIG. 8 there is shown a detail of the left symmetrical half of the embodiment of FIG. 1, whereby a control line 54 is incorporated in a sleeve 55 extending into the annular space formed between the unexpanded and expanded sections 8, 10.

Referring further to FIG. 9, there is shown a cross-sectional view of a pair of control lines 40 arranged in a longitudinal groove 56 provided in the radially outer surface of the unexpanded liner section 8. In FIG. 9A is shown an alternative arrangement whereby the control lines 40 are embedded in an abrasion resistant layer 57 provided to the outer surface of the unexpanded liner section 8.

The control lines 40, 46, 50, 52 and 54 can be formed for example as electrical, hydraulic, pneumatic, optical or mechanical control lines to transmit signals or power.

During normal operation of the embodiment of FIG. 1, the lower end portion of the wall of the yet unexpanded liner 4 is bent radially outward and in axially reverse direction by any suitable means so as to initiate forming of the U-shaped lower section 11. The radially outermost leg 10 of the U-shaped wall is then fixedly connected to the wellbore wall 12, which can occur automatically due to frictional forces between the leg 10 and the wellbore wall 12, or by any other suitable means.

A downward force F of sufficiently large magnitude is then applied to the unexpanded liner section 8 to move the unexpanded liner section 8 gradually downwardly. The wall of the unexpanded liner section 8 is thereby progressively bent and formed into the expanded liner section 10. As a result of such procedure, the bending zone 9 moves in downward direction at approximately half the speed of the unexpanded section 8. In a relative sense, the bending zone 9 moves upwardly relative to the unexpanded section 8. If desired, the diameter and/or wall thickness of the liner 4 can be selected such that the expanded liner section 10 becomes firmly compressed against the wellbore wall 12 as a result of the expansion process so as to create a seal between the expanded liner section 10 and the wellbore wall 12 and/or to stabilize the wellbore wall. Since the length, and hence the weight, of the unexpanded section 8 gradually increases, the downward force F can be lowered gradually in correspondence with the increased weight.

Optionally a heavy weight fluid or a pressurised can be pumped into the annular space between the unexpanded and expanded liner sections 8, 10 during or after the expansion process to reduce the collapse loading on the expanded section 10 or to reduce the burst loading on the unexpanded section 8.

In case of the first arrangement for the control line (FIG. 4), the control line 40 is mechanically connected to the radially outer surface of the unexpanded liner section 8 before or during the eversion process, whereby the length of the control line 40 is selected such that the lower end of the control line 40, i.e. at terminal 44, becomes located at the expanded liner section 10 after the eversion process.

In case of the second arrangement for the control line (FIG. 5), the control line 46 is mechanically connected to the radially outer surface of the unexpanded liner section 8 before or during the eversion process, whereby the length of the control line 46 is selected such that the lower end of the control line 46, i.e. at terminal 48, remains located at the unexpanded liner section 8 after the eversion process.

In case of the third arrangement for the control line (FIG. 6), the control line 50 is mechanically connected to the radially outer surface of the unexpanded liner section 8 before or during the eversion process, whereby the length of the control line 50 is selected such that the lower end of the control line 50, i.e. at terminal 44, becomes located at the expanded liner section 10 after the eversion process.

In case of the fourth arrangement for the control line (FIG. 7), the control line 52 is mechanically connected to the radially outer surface of the unexpanded liner section 8 before or during the eversion process, whereby the length of the control line 52 is selected such that the lower end of the control line 52, i.e. at terminal 48, remains located at the unexpanded liner section 8 after the eversion process.

In case of the fifth arrangement for the control line (FIG. 8), the sleeve 55 with the control line 54 embedded therein, is lowered into the annular space between the unexpanded and expanded sections 8, 10 after the eversion process.

The control lines 40, 46, 50, 52, 54 can be connected to the respective terminals 42, 44, 48 to enable transmission of signals or power between the control lines and the terminals, before or after the eversion process. In case downhole terminal 44 is connected to the unexpanded liner section 8 before the eversion process, downhole terminal 44 needs to be capable of moving through the bending zone of the tubular wall as the bending process proceeds.

Normal operation of the embodiment of FIG. 2 is substantially similar to normal operation of the embodiment of FIG. 1, however with the additional feature that the wall of the U-shaped lower section 11 is supported and guided by the guide surface 20 of guide member 14 so as to promote bending of the wall of the tubular element 4 in the bending zone 9. Furthermore, the guide ring 15 provides additional guidance to the wall in the bending zone 9 during the deformation process.

During normal operation of the embodiment of FIG. 3 the downhole motor 25 is operated to rotate the drill bit 26 so as to deepen the wellbore 24 by further drilling. The drill string 22 gradually moves deeper into the wellbore 24 as drilling proceeds.

The U-shaped lower section 11 of the liner 8 rests on the guide surface 20 of the guide member 14 and moves further into the wellbore 24 simultaneously with the drill string 22. Thus, the U-shaped lower section 11 of liner 4 is continuously in contact with the guide surface 20 of the guide member 14. Initially the downward force F needs to be applied to the unexpanded liner section 8 to induce lowering thereof simultaneously with the drill string 22. However the length of the unexpanded liner section 8, and therefore also its weight, gradually increases so that the downward force F gradually can be decreased and eventually needs to be replaced by an upward force to control the speed of lowering of the unexpanded liner section 8. The weight of the unexpanded liner section 8, in combination with the force F (if any), also can be used to provide the necessary thrust force to the drill bit 26 during further drilling of the wellbore 24. In the embodiment of FIG. 3 such thrust force is transmitted to the drill bit 26 via the guide member 14 and the support ring 32. In an alternative application, the guide member 14 is dispensed with, and the thrust force is directly transmitted from the unexpanded liner section 8 to the drill string 22 or the drill bit 26, for example via suitable bearing means (not shown).

Thus, by gradually lowering the unexpanded liner section 8 into the wellbore, the lower end of the wall of the unexpanded liner section 8 is progressively bent in axially reverse direction, thereby progressively forming the expanded liner section 10. During the expansion process, the U-shaped lower section 11 is supported and guided by the guide surface 20 of guide member 14 so as to promote bending of the lower end of the wall of the unexpanded section 8. The guide ring 15 provides additional guidance to the wall during the expansion process.

As deepening of the wellbore proceeds, sections of pipe are added to the unexpanded liner section 8 at its upper end in correspondence with lowering of unexpanded liner section 8 into the wellbore, as is normal practice for tubular strings such as drill strings, casings or liners that are lowered into a wellbore.

When it is required to retrieve the drill string 22 to surface, for example when the drill bit is to be replaced or when drilling of the wellbore 24 is completed, the support shoulder 32 is radially retracted and the reamer bit 30 is brought to the collapsed mode. Thereafter the drill string 22 is retrieved through the unexpanded liner section 8 to surface. The guide member 14 can remain downhole. Alternatively, the guide member 14 can be made collapsible so as to allow it to be retrieved to surface in collapsed mode through the unexpanded liner section 8.

After the wellbore 24 has been drilled to the desired depth and the drill string 22 has been removed from the wellbore, the length of unexpanded liner section 8 still present in the wellbore 24 can be left in the wellbore 24, or it can be cut off from the expanded section 10 and retrieved to surface.

In case the length of unexpanded liner section 8 is left in the wellbore 24, there are several options for completion of the wellbore, such as:

a) a fluid, for example brine, is pumped into the annular space 44 via conduit 42 so as to pressurise the annular space 44 and thereby to increase the collapse resistance of the expanded liner section 10. Optionally, a hole can be provided in the wall of the liner near its lower end for circulation of the pumped fluid;

b) a heavy fluid is pumped into the annular space 44 via conduit 42 so as to support the expanded liner section 10 and increase its collapse resistance;

c) cement is pumped into the annular space 44 to create, after hardening of the cement, a solid body between the unexpanded liner section 8 and the expanded liner section 10. Suitably, the cement expands upon hardening;

d) the unexpanded liner section 8 is radially expanded against the expanded liner section 10, for example by pumping, pushing or pulling an expander (not shown) through the unexpanded liner section 8.

The control lines 40, 46, 50, 52 and 54 can be applied in combination with the embodiments of FIGS. 2 and 3 in a manner similar to the application described with reference to the embodiment of FIG. 2.

In the above example, expansion of the liner is started in the wellbore. However, in case the wellbore is located below the seabed whereby an offshore platform is situated above the wellbore, it can be advantageous to start the expansion process at the offshore platform. In such process the bending zone moves from the offshore platform to the seabed and from there into the wellbore. Thus, the resulting expanded tubular element not only forms a liner in the wellbore, but also forms a riser from the seabed to the offshore platform. The need for a separate riser from the seabed to the platform is thereby obviated.

Since the length of unexpanded liner section that is left in the wellbore does not need to be expanded, less stringent requirements regarding material properties etc. may apply to it. For example, said length may have a lower or higher yield strength, or a smaller or larger wall thickness than the expanded section.

Instead of leaving a length of unexpanded liner section in the wellbore after the expansion process, the entire liner can be expanded with the method of the invention so that no unexpanded liner section remains in the wellbore. In such case, an elongate member, for example a pipe string, can be used to exert the necessary downward force F to the unexpanded liner section during the last phase of the expansion process.

In order to reduce friction forces between the unexpanded and expanded tubular sections during the expansion process described in any of the aforementioned examples, suitably a friction reducing layer, such as a Teflon layer, is applied between the unexpanded and expanded tubular sections. For example, a friction reducing coating can be applied to the outer surface of the tubular element before expansion. Such layer of friction reducing material furthermore reduces the annular clearance between the unexpanded and expanded sections, thus resulting in a reduced buckling tendency of the unexpanded section. Instead of, or in addition to, such friction reducing layer, centralizing pads and/or rollers can be applied between the unexpanded and expanded sections to reduce the friction forces and the annular clearance there-between.

With the method described above it is achieved that, during the drilling process, there is only a relatively short open-hole section in the wellbore since the expanded liner section extends to near the lower end of the drill string at any time. The method therefore has many advantages. For example, longer intervals can be drilled without setting new casing sections, thereby leading to fewer casing sections of different diameters. Also, if the wellbore is drilled through a shale layer, the short open-hole section eliminates any problems due to a heaving tendency of the shale.

With the method of the invention, the expanded tubular section can extend from surface into the wellbore, or it can extend from a downhole location deeper into the wellbore.

Instead of expanding the expanded liner section against the wellbore wall (as described above), the expanded liner section can be expanded against the inner surface of another tubular element already present in the wellbore.

Furthermore, instead of moving the unexpanded liner section downwardly through the wellbore, the unexpanded liner section can be moved upwardly through the wellbore during the expansion process. Although the examples described above refer to applications of the invention in a wellbore, it is to be understood that the method of the invention also can be applied at the earth surface. For example, the expanded liner section can be expanded against the inner surface of a pipe such as an existing flowline for the transportation of oil or gas located at the earth surface or at some depth below the surface. In this manner such existing flowline is provided with a new lining thereby obviating the need to replace the entire flowline in case it has deteriorated over time.

The invention claimed is:

1. A method of radially expanding a tubular element in a wellbore and providing a control line that extend along the tubular element, the method comprising
   (a) inducing the wall of the tubular element to bend radially outward and in axially reverse direction so as to form an expanded tubular section extending around a remaining tubular section of the tubular element, wherein said bending occurs in a bending zone of the tubular element;
   (b) increasing the length of the expanded tubular section by axially fixing the expanded tubular section and subjecting the remaining tubular section to an axially compressive force so as to induce the bending zone to move in an axial direction relative to the remaining tubular section, wherein said wall includes a material that is plastically deformed in the bending zone during the bending process so that the expanded tubular section retains an expanded shape as a result of said plastic deformation; and
   (c) extending the control line along the tubular element;
      wherein the tubular element is a steel liner or casing and said axially compressive force is applied at the upper end of the unexpanded portion thereof.

2. The method of claim 1 wherein step (b) includes moving the remaining tubular section in an axial direction relative to the expanded tubular section.

3. The method of claim 2 wherein step (c) comprises connecting the control line to the remaining tubular section and allowing the control line to move in an axial direction relative to the expanded tubular section simultaneously with said movement of the remaining tubular section.

4. The method of claim 3 wherein the control line bends adjacent the bending zone simultaneously with said bending of the wall of the tubular element.

5. The method of claim 4 wherein the control line extends from a first terminal at surface to a second terminal provided at one of the expanded tubular section and the remaining tubular section.

6. The method of claim 3 wherein step (c) comprises connecting the control line to one of an outer surface of the remaining tubular section and an inner surface of the remaining tubular section.

7. The method of claim 1 wherein an annular space is formed between the remaining tubular section and the expanded tubular section, and wherein step (c) comprises moving the control line into the annular space.

8. The method of claim 1 wherein the remaining tubular section is subjected to an axially compressive force acting to induce said movement of the remaining tubular section.

9. The method of claim 8 wherein said axially compressive force is at least partly due to the weight of the remaining tubular section.

10. The method of claim 1 wherein the remaining tubular section is axially shortened at a lower end thereof due to said movement of the bending zone, and wherein the method further comprises axially extending the remaining tubular section at an upper end thereof in correspondence with said axial shortening at the lower end.

11. The method of claim 1 wherein a drill string extends through the remaining tubular section for further drilling of the wellbore.

12. The method of claim 11 wherein the remaining tubular section and the drill string are simultaneously lowered through the wellbore during drilling with the drill string.

13. The method of claim 1 wherein the expanded tubular section is compressed against one of the wellbore wall and another tubular element located in the wellbore as a result of said bending of the wall.

14. A radially expanded tubular element obtained using the method of claim 1.

* * * * *